United States Patent
Kamotsky et al.

(10) Patent No.: US 10,565,188 B2
(45) Date of Patent: Feb. 18, 2020

(54) SYSTEM AND METHOD FOR PERFORMING A PATTERN MATCHING SEARCH

(71) Applicant: Macy's West Stores, Inc., Cincinnati, OH (US)

(72) Inventors: Denis Kamotsky, San Francisco, CA (US); Mariel Vargas, San Francisco, CA (US)

(73) Assignee: MACY'S WEST STORES, INC., Cincinnati, OH (US)

( * ) Notice: Subject to any disclaimer, the term of this patent is extended or adjusted under 35 U.S.C. 154(b) by 0 days.

(21) Appl. No.: 14/292,018

(22) Filed: May 30, 2014

(65) Prior Publication Data
US 2015/0347590 A1  Dec. 3, 2015

(51) Int. Cl.
*G06F 16/242* (2019.01)
*G06F 16/332* (2019.01)

(52) U.S. Cl.
CPC .......... *G06F 16/242* (2019.01); *G06F 16/332* (2019.01)

(58) Field of Classification Search
CPC ......... G06F 17/30864; G06F 17/30867; G06F 17/30684; G06F 17/30477; G06F 17/30011; G06F 17/30321; G06F 17/2705; G06F 17/3043; G06F 17/30528; G06F 17/30616; G06F 17/30675; G06F 17/30401; G06F 17/30619; G06F 17/27; G06F 17/30654; G06F 17/2735; G06F 17/275; G06F 17/277; G06F 17/28; G06F 16/242; G06F 16/332
See application file for complete search history.

(56) References Cited

U.S. PATENT DOCUMENTS

| | | | | |
|---|---|---|---|---|
| 5,548,770 | A | * | 8/1996 | Bridges .............. G06F 17/30445 |
| 2006/0018551 | A1 | * | 1/2006 | Patterson .......... G06F 17/30616 |
| | | | | 382/229 |
| 2013/0054569 | A1 | * | 2/2013 | Mo .................... G06F 17/30867 |
| | | | | 707/722 |
| 2013/0238659 | A1 | * | 9/2013 | Roitman ............. G06F 21/6227 |
| | | | | 707/781 |
| 2014/0149106 | A1 | * | 5/2014 | Beretta ................. G06F 17/273 |
| | | | | 704/9 |

\* cited by examiner

*Primary Examiner* — Amanda L Willis
(74) *Attorney, Agent, or Firm* — Amster, Rothstein & Ebenstein LLP

(57) ABSTRACT

A method including the steps of: receiving a search query containing search terms from a user device; retrieving from one or more data storage devices, search configuration information in response to the received search query, wherein the search configuration information comprises a designated field set; generating a plurality of query partitions based on the received search query; generating one or more internal query clauses based on all possible combinations of sub-phrases of the plurality of query partitions and fields from the designated field set; executing a query on a database based on the one or more internal query clauses; generating query results based on the executed query; calculating match metrics for all query results; determining query results having match metrics that satisfy configured match constraints as legitimate matches; and detecting patterns based on corresponding matched terms and fields of the legitimate matches.

11 Claims, 7 Drawing Sheets

SYSTEM AND METHOD FOR PERFORMING A PATTERN MATCHING SEARCH

FIELD OF THE INVENTION

The present invention generally relates to systems and methods for searching a database, and more particularly, the present invention relates to systems and methods for a search engine adaptable for an electronic commerce website to generate more precise search results by using pattern matching.

SUMMARY OF THE INVENTION

Systems and methods for performing searches using pattern matching are provided.

A method according to an exemplary embodiment of the present invention comprises the steps of: receiving, using one or more processors, a search query containing search terms from a user device; retrieving, using one or more processors, from one or more data storage devices, search configuration information in response to the received search query, wherein the search configuration information comprises a designated field set; generating, using one or more processors, a plurality of query partitions based on the received search query; generating, using one or more processors, one or more internal query clauses based on all possible combinations of sub-phrases of the plurality of query partitions and fields from the designated field set; executing, using one or more processors, a query on a database based on the one or more internal query clauses; generating, using or more processors, query results based on the executed query; calculating, using one or more processors, match metrics for all query results; determining, using one or more processors, query results having match metrics that satisfy configured match constraints as legitimate matches; and detecting, using one or more processors, patterns based on corresponding matched terms and fields of the legitimate matches.

In an exemplary embodiment, the method further comprising the step of: transmitting, using one or more processors, the legitimate matches as search results to the user device.

In an exemplary embodiment, the method further comprising the step of: storing, using one or more processors, the detected patterns for use in additional searches.

In an exemplary embodiment, the user device is remotely located from the one or more processors.

In an exemplary embodiment, the plurality of query partitions form a query partition coverage.

In an exemplary embodiment, the maximum number of terms of a sub-phrase shingle in the plurality of query partitions is less than the number of search terms in the search query.

In an exemplary embodiment, the step of generating one or more internal query clauses comprises generating a plurality of designated field subsets based on permutations of the designated field set.

In an exemplary embodiment, the configured match constraints comprise matching all search terms in one or more fields of the designated field set.

In an exemplary embodiment, the configured match constraints comprise matching all terms of a field in the designated field set.

In an exemplary embodiment, the database comprises indexed values that have been generated by shingling a single valued field.

A system according to an exemplary embodiment of the present invention comprises: at least one processor; at least one non-transitory processor readable medium operatively connected to at least one processor having processor readable instructions stored thereon which, when executed by the at least one processor, cause the at least one processor to perform the following method: receiving, using one or more processors, a search query containing search terms from a user device; retrieving, using one or more processors, from one or more data storage devices, search configuration information in response to the received search query, wherein the search configuration information comprises a designated field set; generating, using one or more processors, a plurality of query partitions based on the received search query; generating, using one or more processors, one or more internal query clauses based on all possible combinations of sub-phrases of the plurality of query partitions and fields from the designated field set; executing, using one or more processors, a query on a database based on the one or more internal query clauses; generating, using or more processors, query results based on the executed query; calculating, using one or more processors, match metrics for all query results; determining, using one or more processors, query results having match metrics that satisfy configured match constraints as legitimate matches; and detecting, using one or more processors, patterns based on corresponding matched terms and fields of the legitimate matches These and other features of this invention are described in, or are apparent from, the following detailed description of various exemplary embodiments of this invention.

BRIEF DESCRIPTION OF THE DRAWINGS

The features and advantages of the present invention will be more fully understood by reference to the following detailed description of illustrative embodiments of the present invention when taken in conjunction with the following figures, wherein.

DETAILED DESCRIPTION

Figure 1:
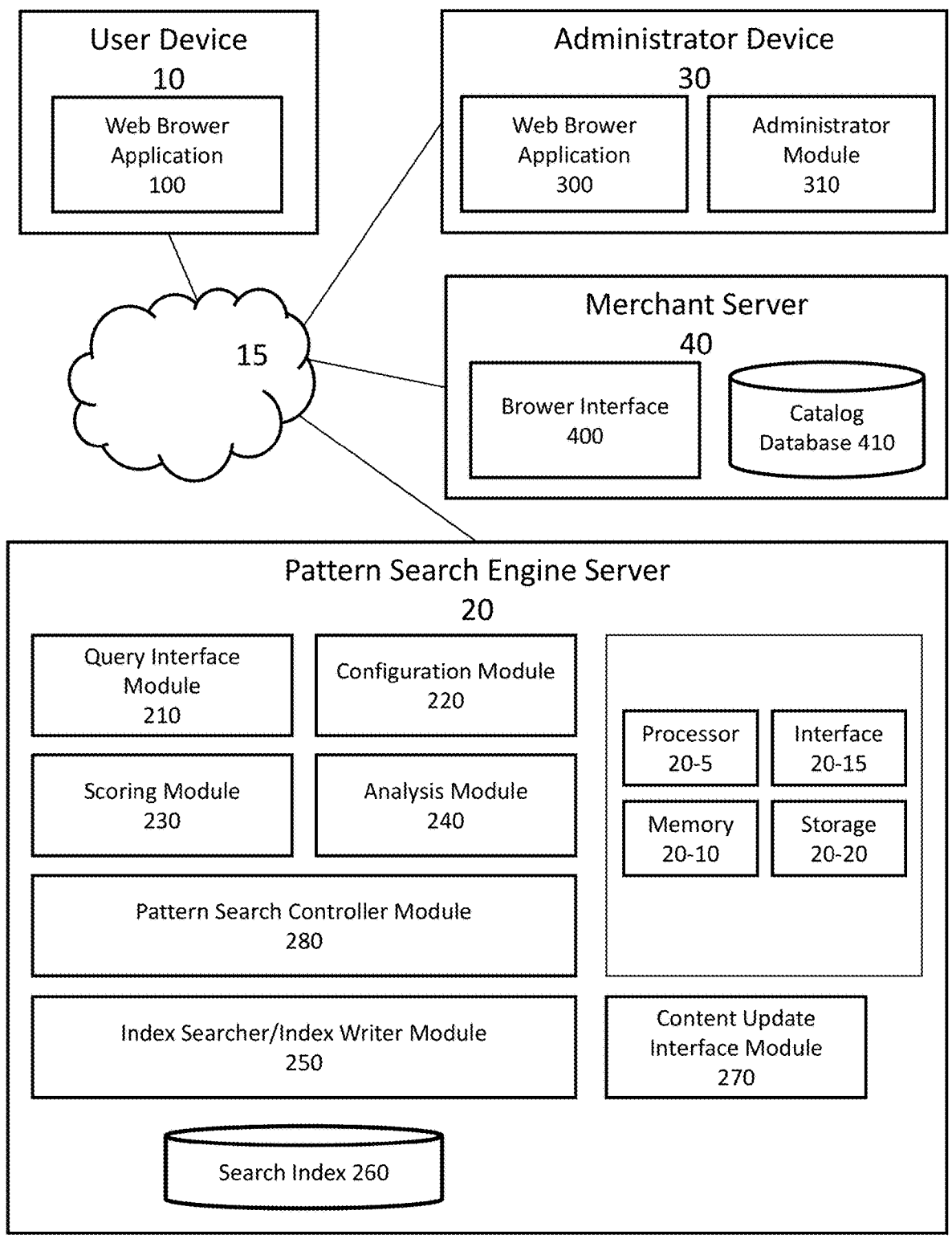
FIG. 1 is a schematic diagram of a pattern match pattern search engine server system in accordance with exemplary embodiments of the present invention.

In determining search results, such as search results for a keyword-based product search query on an electronic commerce website, it is important to consider the context of a search in order to improve the precision of the search results. Context information contained in a search query string may be helpful in determining the objective of a search query.

Context information may be derived, for example, from a specific sequence of words of the search query string.

Conventionally, a full text search engine adapted for a keyword-based product search discards context information associated with the search query string. The typical search engine partitions the search query string into individual words and attempts to match each word separately to individual words of a field value in a search index. This type of search is known as a tokenized text search. By splitting the query into individual words and matching on individual words, the typical search engine produces more matches but any context information attributable to certain word combinations that may help narrow search results is lost. Thus, the search results generated by a typical full text search engine may offer good recall (portion of relevant products returned among all relevant products in the database) but sacrifice precision (portion of products in the returned results that are relevant among all returned results). Typically, the loss in precision may be offset by ranking the search results according to some relevance criteria and sorting search results according to its relevancy ranking.

Although such a trade-off may be appropriate for general document searches, it may be less appropriate for keyword based product searches which are more prone to issues of polysemy, i.e., the capacity for a word or phrase to have multiple related meanings. Typically, brand names in product description information may contribute to the polysemy issue because brand names often contain descriptive terms that are not used in a descriptive sense. For example, consider the situation of an online shopper entering the search query "pink sweater" at an online merchant's website that offered for sale pink sweaters as well as sweaters from the following brands Thomas Pink® and Pink Lotus®. If the website were to use a typical tokenized text search, it would be unable to determine from the context of the search that the objective was to search for pink colored sweaters. A typical tokenized text search would generate search results including sweaters that are pink and sweaters of any color from Thomas Pink® or Pink Lotus® because the query words "pink" and "sweater" are separately matched. When precision is low, even the conventional technique of ranking search results may not be helpful. Detecting the context of a keyword based product search would mitigate the loss in precision due to polysemy issues.

The context of a search query may be revealed by attempting to detect patterns in a search query string. Patterns may be detected by attempting to match combinations of words rather than individual words of a search query string against field values in different product fields. A pattern matching strategy for a search engine may involve dividing a search query string into various sub-phrases, i.e., words or combinations of words, and attempting to match each sub-phrase to a value of a field as a whole, i.e., all the words, rather than individual words of a field value, in various product fields of a search index. For instance, in the "pink sweater" search example, a product having the following field attribute values: COLOR: "pink" and PRODUCT_TYPE: "sweater" would be an exact match for the search query "pink sweater" because the query string may be partitioned into the sub-phrases "pink" and "sweater" which would match on the entire field value of the field COLOR and PRODUCT_TYPE respectively and leave no terms in those fields unmatched. But a product having the following field attribute values: BRAND: "thomas pink" and PRODUCT_TYPE: "sweater" would not match because the sub-phrase "pink" would not match on the entire field value of the field, BRAND: "thomas pink", unless a partial match in the BRAND field is allowed. In this example, the pattern COLOR="pink" and PRODUCT_TYPE="sweater" would emerge based on the product information stored in the database. These discovered patterns may be used as search parameters to refine subsequent searches.

Accordingly, various exemplary embodiments of the present invention are directed to systems and methods for implementing a search engine platform adaptable for an electronic commerce website, or other types of searchable electronic documents, that can perform pattern matching to improve the precision of search results. The pattern search engine servers in the exemplary embodiments attempt to determine the context of a search by finding patterns in a search query. In at least one exemplary embodiment, the pattern search engine servers generate an internal query clause for a search index that attempts to match different combinations of words in a search query string in different product fields (e.g., COLOR, BRAND, PRODUCT_TYPE, etc.) to whole phrases indexed in the search index. In addition, the pattern search engine servers in the exemplary embodiments may be configured to perform exact matches, best partial matches, partial matches, and all term matches.

The various exemplary embodiments of the present invention described herein may be implemented using one or more computer systems including one or more processors, one or more memory devices, one or more communication interfaces, and one or more persistent storage devices, including, one or more non-transitory computer readable media including computer-readable code containing instructions for the one or more processors to perform processing steps of a pattern searching algorithm. The one or more computer systems may form part of a network, such as a local area network or a wide area network, such as, for example, the Internet. In at least one exemplary embodiment, the one or more computer systems may include standard hardware components and/or specialized hardware components.

The systems and methods of the present invention may be operated as part of a system for electronic commerce comprising one or more user devices that interact through a network with one or more merchant servers that offer goods for sale via a web page or electronic application. Referring to FIG. 1, search queries generated by online shoppers from one or more user devices 10, such as tablets, smartphones, or computers, connected through a network, such as the Internet 15, may be transmitted to one or more merchant servers 40 which, in turn may transmit the search query through the network to one or more pattern search engine servers 20. One or more administrator devices 30, connected through the network to one or more merchant servers 40 or one or more pattern search engine servers 20, may be used for configuring such servers. In other embodiments, one or more of the functions of each of these devices and servers may be combined into a single server, and/or divided up among one or more other servers performing duplicate and/or portions of the functions.

Referring to FIG. 1, a pattern search engine server 20 may contain a query interface module 210 to receive search queries and to sort and transmit search results, a content update interface module 270 to receive indexing requests, a configuration module 220 to manage configuration information, an analysis module 240 to analyze query or field terms, a scoring module 230 to calculate relevancy ranks of search results, a pattern search controller module 280 to manage a pattern searching algorithm, and an index searcher/writer module 250 that interfaces with a search index database 260 to create or edit indexed terms or to search an index for a particular term.

In at least one exemplary embodiment, the index searcher/writer module 250 and the search index database 260 may be modules from a basic document search engine that are capable of a full text search using a searchable keyword index. Typically, the search index database 260 may comprise one or more documents and each document having one or more fields that may be separately indexed for searching. In connection with an electronic commerce application, a "document" may correspond to a particular product sold by a merchant and each searchable field of a document may correspond to a certain attribute of the product, such as, but not limited to, brand, size, color, type, etc.

Figure 2:
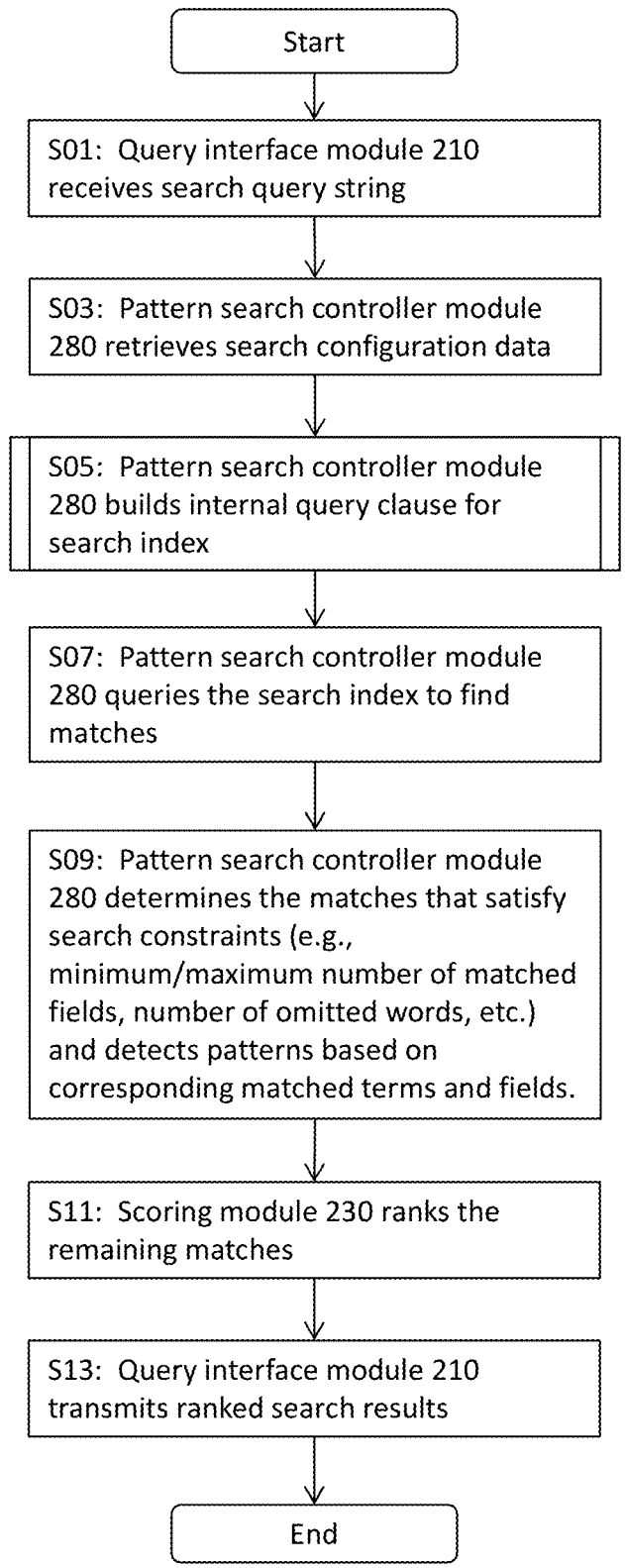
FIG. 2 is a high level flow chart of a process for a pattern match search in accordance with exemplary embodiments of the present invention.

FIG. 2 shows a high level flow chart illustrating an exemplary pattern search algorithm. In step S01, a query interface module 210 of pattern search engine server 20 receives a search query string. In step S03, the pattern search controller module 280 retrieves search configuration information (e.g., including search parameters and search constraints for various search strategies) from the configuration module 220. In step S05, the pattern search controller module 280 builds an internal query clause for the index searcher/index writer module 250 based on the received search query string and the retrieved search configuration information. In step S07, the pattern search controller module 280 executes the generated internal query clause to find all matches in the product data that is stored in search index 260. In step S09, the pattern search controller module 280 finds patterns in the search query by calculating certain match metrics, evaluating the matches according to the calculated match metrics and the configured search constraints, determining the matches that satisfy the configured search constraints, and detecting patterns based on the corresponding matched terms and fields of the legitimate matches. The detected patterns are stored as additional search parameters for subsequent searches. In step S11, the scoring module 230 may rank the legitimate matches. In step S13, the query interface module 210 transmits the legitimate matches as search results.

Figure 3:
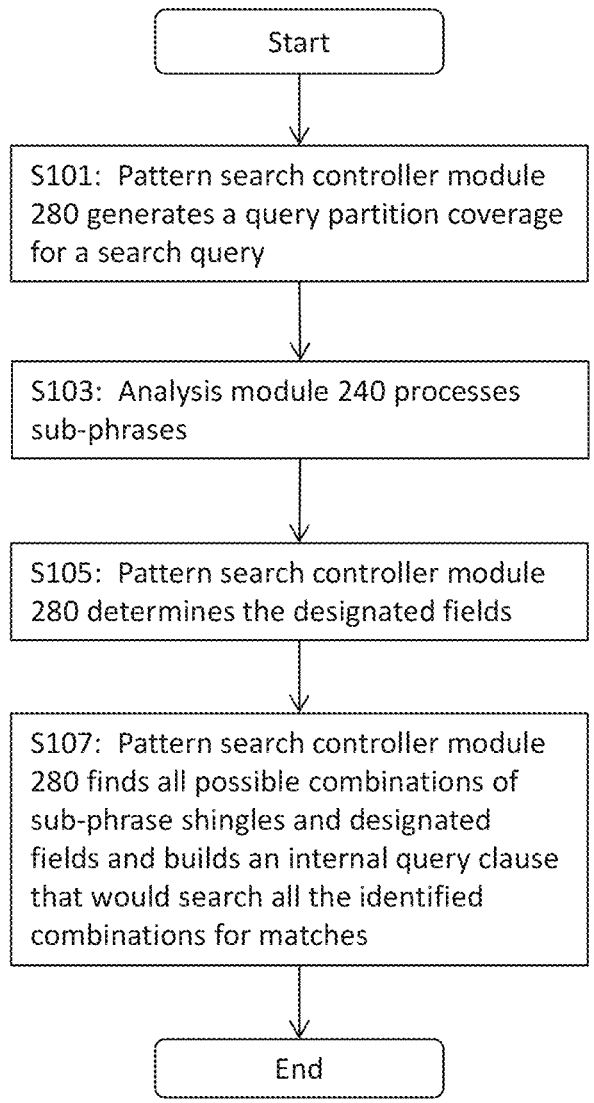
FIG. 3 is a high level flow chart of a process for a building an internal query clause for a pattern match search in accordance with exemplary embodiments of the present invention.

FIG. 3 shows a high level view of the query building process used to generate the internal query clause. In step S101, the pattern search controller module 280 generates a plurality of query partitions from the search query string. A query partition is a division of a query string into a set of one or more non-overlapping substrings, i.e., sub-phrases. Each sub-phrase may be composed of a single word or a combination of consecutive words from the query string and each word in the query string can appear only once in each query partition. This process of building non-overlapping substrings from words or combinations of adjacent words from a string is called shingling. Each sub-phrase is also called a shingle. The shingling process should not disturb the general sequence or order of the words of the query string.

The plurality of query partitions generated by the pattern search controller module 280 form a query partition coverage for the search query string. A query partition coverage is all possible query partitions that may be generated from the search query string. A query string having n number of words would have at most $2^{n-1}$ partitions in its query partition coverage and the size of the query partitions will range from 1 to n. For example, for a search query phrase "blue calvin klein jeans", the following query partition coverage would be generated:

| Partition | Sub-phrase 1 | Sub-phrase 2 | Sub-phrase 3 | Sub-phrase 4 |
|---|---|---|---|---|
| 1 | blue | calvin | klein | jeans |
| 2 | blue | calvin | klein jeans | |
| 3 | blue | calvin klein | jeans | |
| 4 | blue | calvin klein jeans | | |
| 5 | blue calvin | klein | jeans | |
| 6 | blue calvin | klein jeans | | |
| 7 | blue calvin klein | jeans | | |
| 8 | blue calvin klein jeans | | | |

A partition coverage may have less than $2^{n-1}$ partitions, if the length of sub-phrases is limited. If the maximum length of a sub-phrase is limited, the size of the smallest query partition is also limited.

In step S103, the analysis module 240 may process the sub-phrases generated in step S101. In particular, the analysis module 240 includes one or more analyzers used to extract all relevant terms from a text string by breaking the text string into words and filtering stop-words and then applying various transformations such as lowercasing, removing plurals, or stemming etc. to normalize the terms of a text string. Ideally, the same analyzer is used to process field values of a document associated with a product for indexing and query strings for query building. Applying the same series of transformations ensures that a match can be found even if a term in a query string and a term in the original product information text do not match exactly character-by-character. The original terms in the product information text may be stored in addition to the transformed terms that is stored in the index so that the original terms can be displayed in the search result.

The analysis module 240 may be configured to support a different analyzer for each field. Each field may also have its own dictionary that specifies which words to exclude for indexing and query building. The analysis module 240 should not change the word order of the terms in the original text in the analyzed terms.

Dictionaries may also provide additional instructions to the pattern search controller module 280 on how to modify a search query. Dictionaries contain information about what words are related to what other words, what words should be completely ignored (i.e., stop-words) etc. For example, one such instruction may indicate similarity of certain words. SIM ("blue", "turquoise") will instruct the pattern search controller module 280 to try both "blue" and "turquoise" when a search query includes one of the two words. Dictionary relationships may contain multi-word phrases. For example, another instruction may indicate equality between a single word phrase and a multi-word phrase. In particular, EQ ("INC", "International Concepts") will instruct the pattern search controller module 280 to make the two-word shingle "International Concepts" match a product which has BRAND: "INC" in the database.

In step S105, the pattern search controller module 280 determines the designated fields for the search from the search configuration information. One or more fields may be designated to be searched for each search. Searches are only executed in the designated fields. The designated field set may be a configurable parameter for each search.

In step S107, the pattern search controller module 280 determines all possible combinations of the sub-phrase shingles of each query partition and designated fields in which to search for the sub-phrase shingles and generates one or more internal query clause that attempts to exhaustively search all the possible combinations to find matches.

In at least one embodiment, the internal query building process entails generating a plurality of designated field subsets from a designated field set having m number of fields. The plurality of designated field subsets generated by the pattern search controller module 280 form a designated field subset coverage for the designated field set. A designated field subset coverage may include permutations and partial permutations of the designated field set. Each designated field subset is an ordered subset of k elements from the designated field set. In at least one exemplary embodiment, in connection with the query partition coverage, the pattern search controller module 280 generates a designated field subset coverage including all k-length permutations and partial permutations of the designated field set for k ranging between the size of the smallest query partition and the size of the largest query partition in the query partition coverage. For each particular length k, where k is less than m, m·(m−1)·(m−2) . . . (m−k+1) designated field permutation subsets are generated, assuming no field repetition is allowed. If field repetition is allowed in each field, $m^k$ designated field permutation subsets for each length k may be generated.

For example, for a designated field set including BRAND, PRODUCT_TYPE, and COLOR, the generated designated field permutation subsets of size equal to 2 would include:

| field permutation 1 | BRAND | PRODUCT_TYPE |
|---|---|---|
| field permutation 2 | BRAND | COLOR |
| field permutation 3 | PRODUCT_TYPE | BRAND |
| field permutation 4 | PRODUCT_TYPE | COLOR |
| field permutation 5 | COLOR | BRAND |
| field permutation 6 | COLOR | PRODUCT_TYPE |

If field repetition is allowed for the BRAND, PRODUCT_TYPE, and COLOR fields, the generated designated field permutation subsets of size equal to 2 would include the following designated field permutation subsets in addition to the designated field permutation subsets listed in the table above:

| field permutation 7 | BRAND | BRAND |
|---|---|---|
| field permutation 8 | PRODUCT_TYPE | PRODUCT_TYPE |
| field permutation 9 | COLOR | COLOR |

Once the designated field subset coverage is generated, the pattern search controller module 280 generates one or more internal query clauses to find all possible matches for every query partition against every designated field permutation subset of the same size. It is not enough to attempt to find a match in just one designated field permutation subset. Every designated field permutation or partial permutation is tried against every query partition of the same size.

For example, referring to the examples above, for a query string consisting of "blue calvin klein jeans" and a designated field set consisting of {BRAND, PRODUCT_TYPE, COLOR}, the tables below represent matrices of all possible combinations of designated fields and sub-phrase shingles for query partitions of size 2 and corresponding internal search query clauses. The pattern search controller module 280 would attempt to find a match for each of these search clauses. A match occurs if the matching conditions of each of the fields is met by the same product match.

| Query Partition 4 | |
|---|---|
| "blue" | "calvin klein jeans" |
| designated field permutation subset 1 | BRAND = "blue" AND PRODUCT_TYPE = "calvin klein jeans" |
| designated field permutation subset 2 | BRAND = "blue" AND COLOR = "calvin klein jeans" |
| designated field permutation subset 3 | PRODUCT_TYPE = "blue" AND BRAND = "calvin klein jeans" |
| designated field permutation subset 4 | PRODUCT_TYPE = "blue" AND COLOR = "calvin klein jeans" |
| designated field permutation subset 5 | COLOR = "blue" AND BRAND = "calvin klein jeans" |
| designated field permutation subset 6 | COLOR = "blue" AND PRODUCT_TYPE = "calvin klein jeans" |
| designated field permutation subset 7* | BRAND = "blue" AND BRAND = "calvin klein jeans" |
| designated field permutation subset 8* | PRODUCT_TYPE = "blue" AND PRODUCT_TYPE = "calvin klein jeans" |
| designated field permutation subset 9* | COLOR = "blue" AND COLOR = "calvin klein jeans" |

*with repetition

| Query Partition 6 | |
|---|---|
| "blue calvin" | "klein jeans" |
| designated field permutation subset 1 | BRAND = "blue calvin" AND PRODUCT_TYPE = "klein jeans" |
| designated field permutation subset 2 | BRAND = "blue calvin" AND COLOR = "klein jeans" |
| designated field permutation subset 3 | PRODUCT_TYPE = "blue calvin" AND BRAND = "klein jeans" |
| designated field permutation subset 4 | PRODUCT_TYPE = "blue calvin" AND COLOR = "klein jeans" |
| designated field permutation subset 5 | COLOR = "blue calvin" AND BRAND = "klein jeans" |
| designated field permutation subset 6 | COLOR = "blue calvin" AND PRODUCT_TYPE = "klein jeans" |
| designated field permutation subset 7* | BRAND = "blue calvin" AND BRAND = "klein jeans" |
| designated field permutation subset 8* | PRODUCT_TYPE = "blue calvin" AND PRODUCT_TYPE = "klein jeans" |
| designated field permutation subset 9* | COLOR = "blue calvin" AND COLOR = "klein jeans" |

*with repetition

| Query Partition 7 | |
|---|---|
| "blue calvin klein" | "jeans" |
| designated field permutation subset 1 | BRAND = "blue calvin klein" AND PRODUCT_TYPE = "jeans" |
| designated field permutation subset 2 | BRAND = "blue calvin klein" AND COLOR = "jeans" |
| designated field permutation subset 3 | PRODUCT_TYPE = "blue calvin klein" AND BRAND = "jeans" |
| designated field permutation subset 4 | PRODUCT_TYPE = "blue calvin klein" AND COLOR = "jeans" |
| designated field permutation subset 5 | COLOR = "blue calvin klein" AND BRAND = "jeans" |
| designated field permutation subset 6 | COLOR = "blue calvin klein" AND PRODUCT_TYPE = "jeans" |
| designated field permutation subset 7* | BRAND = "blue calvin klein" AND BRAND = "jeans" |
| designated field permutation subset 8* | PRODUCT_TYPE = "blue calvin klein" AND PRODUCT_TYPE = "jeans" |
| designated field permutation subset 9* | COLOR = "blue calvin klein" AND COLOR = "jeans" |

*with repetition

In this example, if there were products in the database having the following field attributes COLOR="blue";

BRAND="calvin klein jeans"; and PRODUCT_TYPE="jeans", one or more of these products would exactly match an internal query clause COLOR="blue" AND BRAND="calvin klein jeans" but only match one prong of an internal query clause containing PRODUCT_TYPE=jeans and so the pattern that emerges from these search clauses is COLOR="blue" and BRAND="calvin klein jeans". The detected pattern may be used to refine subsequent searches.

Figure 4A:
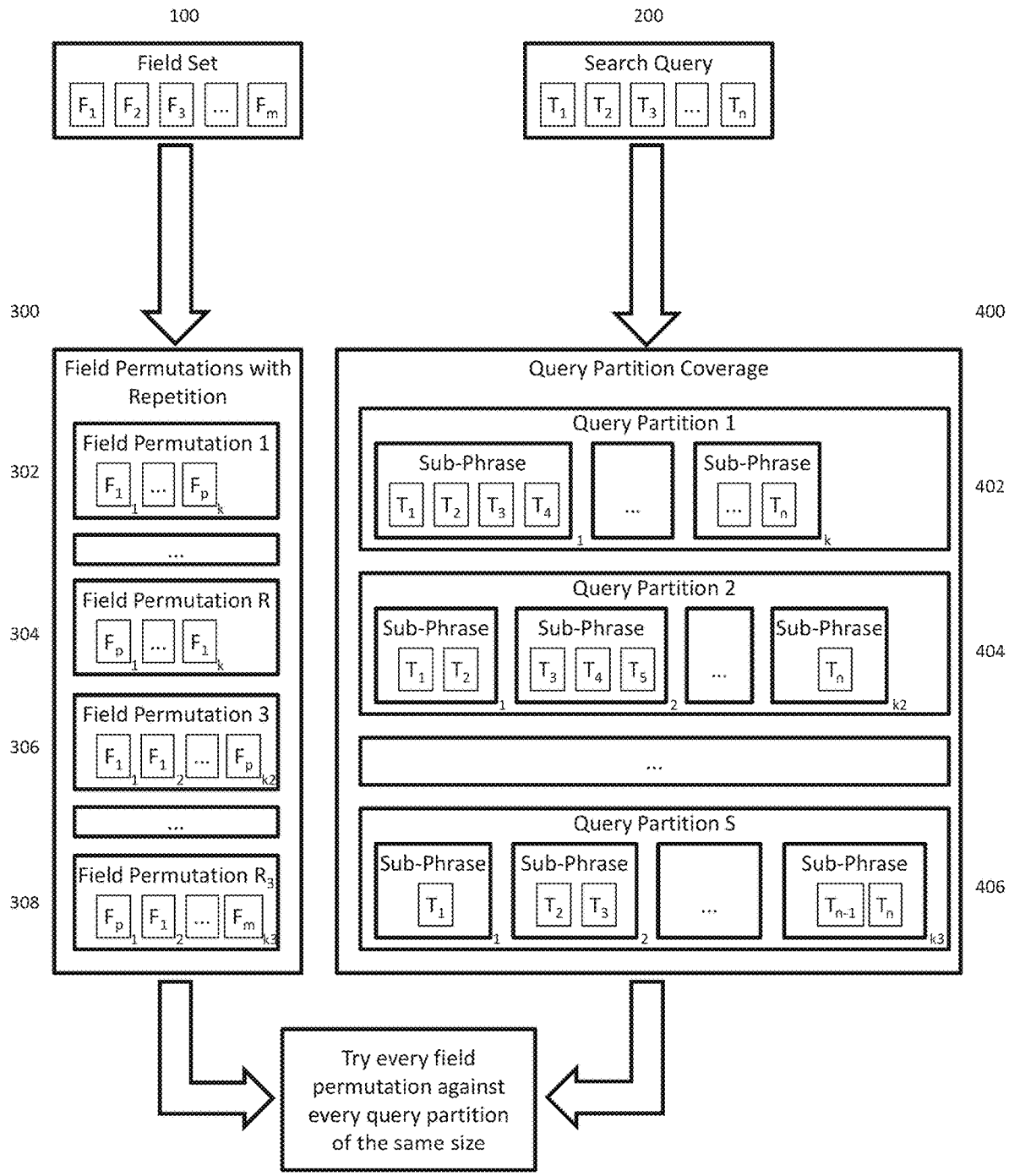
FIGS. 4A and B illustrate a generalized query building process for a pattern match search in accordance with exemplary embodiments of the present invention.
Figure 4B:
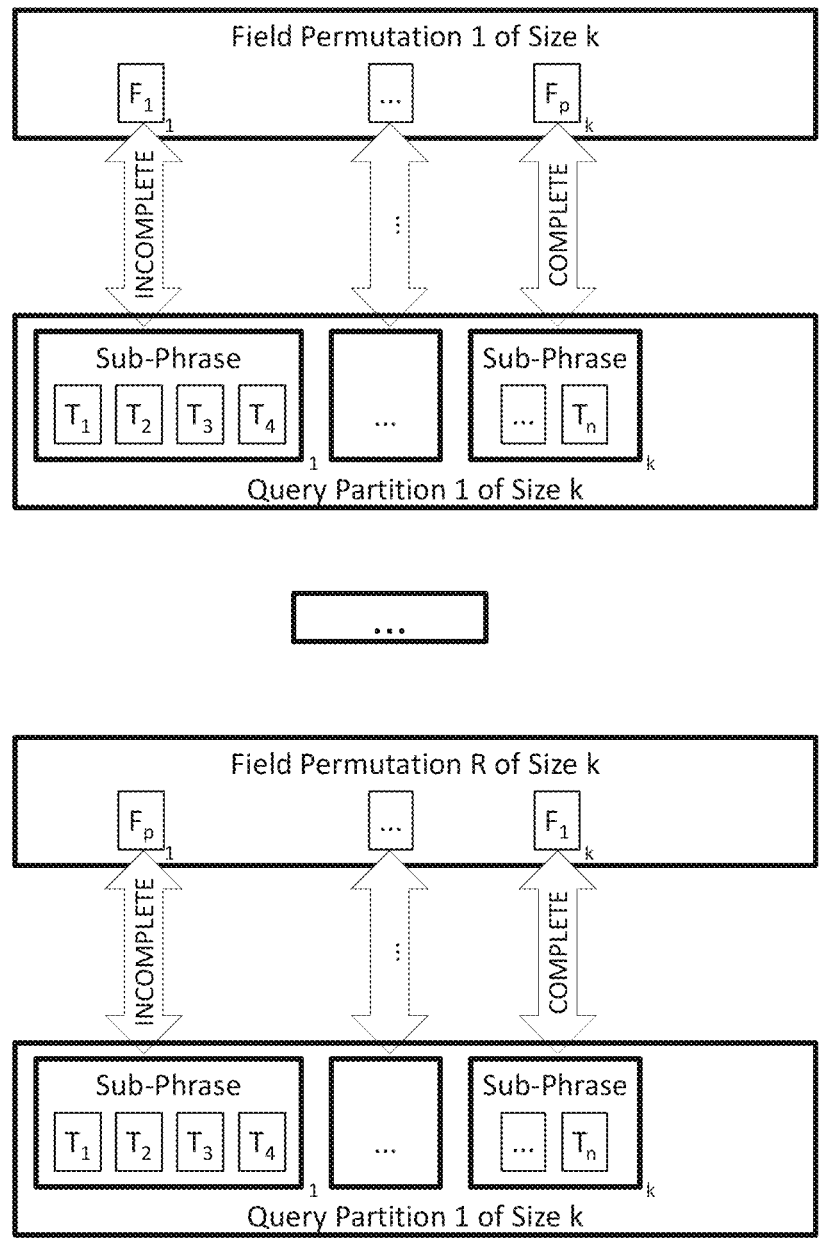

FIGS. 4A and B combined are a graphical representation of a generalized view of the pattern matching process. FIG. 4A shows a graphical representation of an exemplary query partition coverage 400 for a search query 200 comprising search words $T_1 \ldots T_n$. FIG. 4A shows a graphical representation of an exemplary field permutations set 300 for a field set 100 comprising fields $F_1 \ldots F_m$. For field permutation set of size k, there are R possible field permutations. Referring to FIGS. 4A and B, for Query Partition 1 402 which has k sub-phrases, the pattern search controller module 280 must attempt to find matches for each sub-phrase in Query Partition 1 using all field permutation subsets containing k fields. In the exemplary embodiment shown, such field subsets include Field Permutation 1 302 and Field Permutation R 304. The pattern search controller module 280 forms a query to search each combination of Sub-Phrase 1 of Query Partition 1 in Field 1 of Field Permutation 1 to Sub-Phrase k of Partition 1 in Field k of Field Permutation 1 through Sub-Phrase 1 of Query Partition 1 in Field 1 of Field Permutation R to Sub-Phrase k of Partition 1 in Field k of Field Permutation R, where R is the number of field permutations of length k for a particular field set 100 and k ranges between the minimum number of sub-phrases in a query partition to the maximum number of sub-phrases in a query partition.

In at least one exemplary embodiment, the internal query building process entails generating an internal search query clause without the need to build appropriate designated field permutation subsets by assuming field repetition is allowed for all the designated fields. When field repetition is presumed to be allowed for all fields in the designated field set (i.e., when multiple matches on a field by different sub-phrases of one query partition are allowed), the implementation of the pattern search algorithm may be simplified. The query building process becomes less complex because any sub-phrase of a query partition may be matched against any field including a field that was already matched on by another sub-phrase of the query partition. The broader and simpler query clause may produce matches that may not be legitimate (e.g., repeated matches on a particular field when multiple matching is not allowed for the particular field), however, spurious matches may be filtered out by evaluating matches against a match criteria. A match constraint configuration parameter may indicate which fields allow or do not allow multiple matches.

For example, referring to the examples above, for a search query string "blue calvin klein jeans", the pattern search controller module 280 attempts to match every combination of adjacent words from this query, i.e., "blue", "blue calvin", "blue calvin klein", "blue calvin klein jeans", "calvin", "calvin klein", "calvin klein jeans", "klein", "klein jeans", and "jeans" to every field designated for the search, e.g., COLOR, BRAND, PRODUCT_TYPE, etc.

Thus, for each sub-phrase, a multi-field clause may be generated as a disjunction of queries to match the sub-phrase against each field. For example, to search for a sub-phrase "calvin klein" in any field of a designated field set consisting of {BRAND, PRODUCT_TYPE, COLOR}, the following multi-field query clause would be generated: (BRAND="calvin klein" OR PRODUCT_TYPE="calvin klein" OR COLOR="calvin klein"). Such a multi-field query (MFQ) clause may be used as a building block of a query partition clause in generating a complex query to perform various matching strategies.

Figure 5:
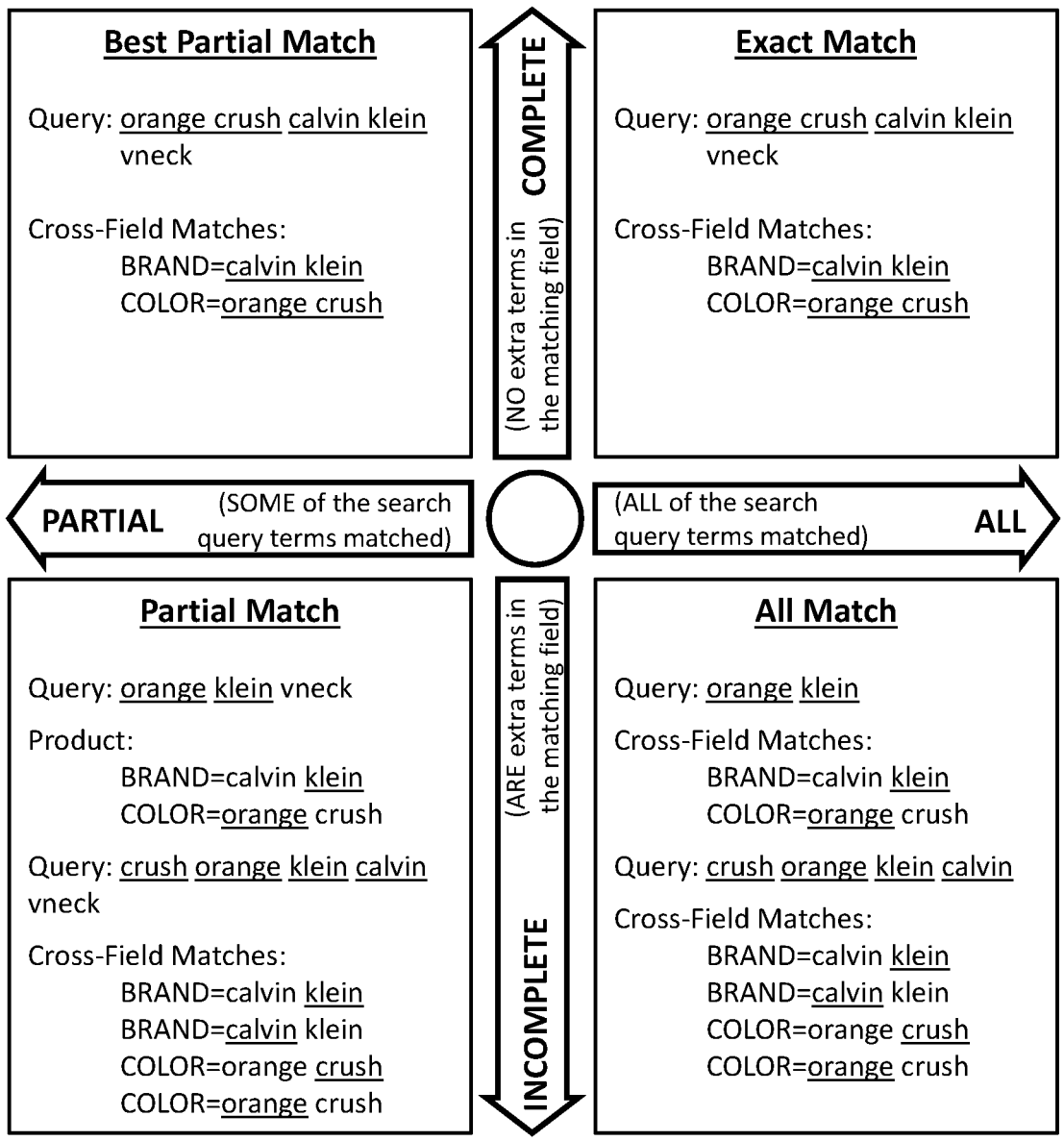
FIG. 5 is a chart showing different types of match strategies that can be implemented in a pattern match search, organized along two axes in accordance with exemplary embodiments of the present invention.

Each search may have its own match strategy (e.g., require matching of some or all sub-phrase shingles of a query partition) and each field of a search may have its own match strategy (e.g., requiring a complete or incomplete match of a field value). Referring to FIG. 5, there are several types of match strategies that can be implemented in a pattern match, as organized along two axes in the illustration. The axes relate to where unmatched terms are allowed either in the query and/or in the field values. Each quadrant defines a match strategy: exact match, all match of query terms, best partial match, and partial match. For an exact match, all query terms are matched and there are no extra terms in the matching field. For an all match of query terms, all query terms are matched but there are terms left unmatched in the matching field. For a best partial match, some of the query terms are matched and there are no extra terms in the matching fields. For a partial match, some of the query terms are matched and there are extra terms in the matching field.

Figure 6A:
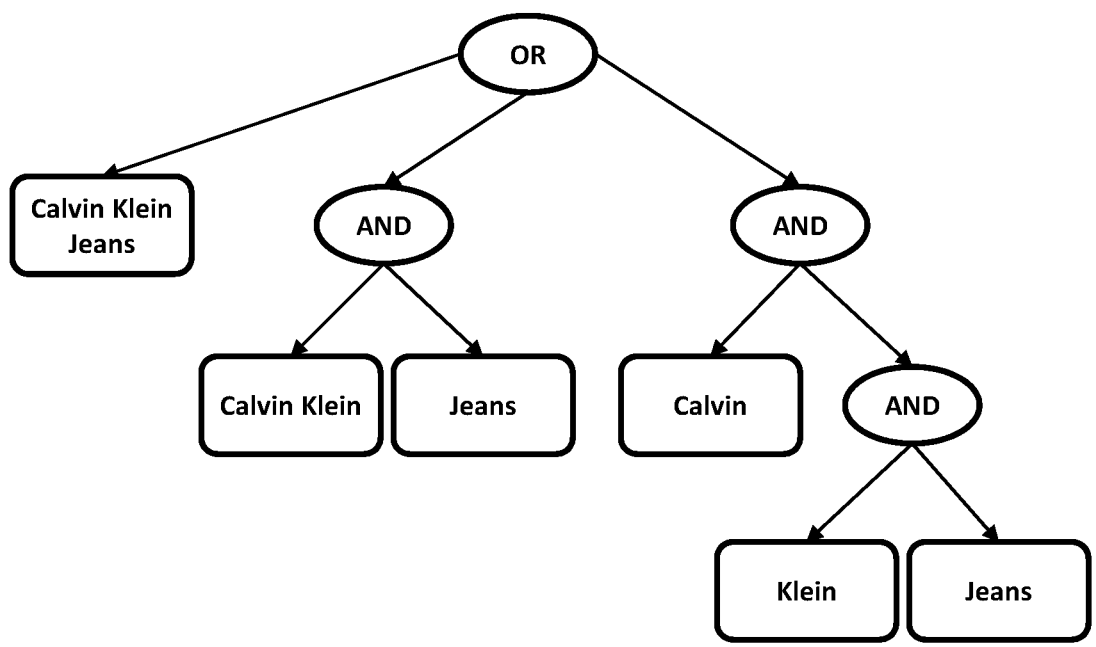
FIGS. 6A and B illustrate an internal search query clauses in accordance with exemplary embodiments of the present invention.

In an exact pattern match, all words in the query must match the corresponding designated fields of one document. For an exact match to happen, each sub-phrase within a particular query partition must match some field, i.e., the MFQ clause for each sub-phrase must produce a match. Therefore, the pattern search controller module 280 builds a conjunction across all MFQ clauses for a particular query partition. An exact match may occur in any query partition. Therefore, the pattern search controller module 280 builds a disjunction across each query partition clause. For example, for a search query "calvin klein jeans", the following internal query would be generated:
(BRAND="calvin klein jeans" OR PRODUCT_TYPE="calvin klein jeans" OR COLOR="calvin klein jeans") OR
((BRAND="calvin klein" OR PRODUCT_TYPE="calvin klein" OR COLOR="calvin klein") AND (BRAND="jeans" OR PRODUCT_TYPE="jeans" OR COLOR="jeans")) OR
((BRAND="calvin" OR PRODUCT_TYPE="calvin" OR COLOR="calvin") AND (BRAND="klein" OR PRODUCT_TYPE="klein" OR COLOR="klein") AND (BRAND="jeans" OR PRODUCT_TYPE="jeans" OR COLOR="jeans")).
This may be expressed as MFQ ("calvin klein jeans") OR (MFQ ("calvin klein") AND MFQ ("jeans")) OR MFQ ("calvin") AND MFQ ("klein") AND MFQ ("jeans"). FIG. 6A illustrates a graphical representation of this internal query clause.

Only some of the matches will end up using all words from the search query. For example, a product having the following field attribute values: BRAND: "calvin klein" and PRODUCT_TYPE: "jeans" would match the second query partition clause. While a product having the following field attribute values: BRAND: "calvin klein" and PRODUCT_TYPE: "skirt" would not produce a match, because the query term "skirt" would not be consumed. Thus, in this example, the pattern BRAND="calvin klein" and PRODUCT_TYPE="jeans" is detected.

In a partial pattern match, only some words in a query participate in the match. Since there is no requirement that all sub-phrases within a particular query partition must participate in the match, the pattern search controller module 280 builds a disjunction across all MFQ clauses.

For example, for a search query "calvin klein jeans", the following internal query would be generated:
MFQ ("calvin klein jeans") OR (MFQ ("calvin klein") OR MFQ ("jeans")) OR MFQ ("calvin") OR MFQ ("klein") OR MFQ ("jeans").

Figure 6B:
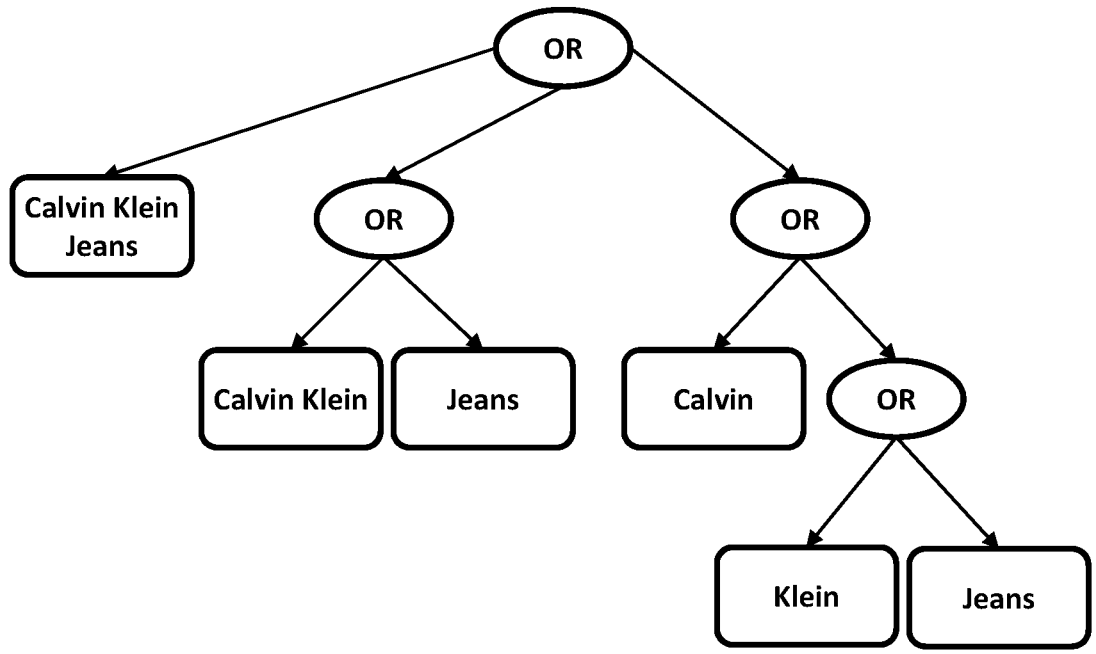

FIG. 6B illustrates a graphical representation of this internal query clause. A product having the following field attributes: BRAND: "calvin klein" and PRODUCT_TYPE: "skirt" would produce a single match on the MFQ ("calvin klein") clause in the second partition query clause.

Whether a match on one MFQ clause is sufficient to be a legitimate match depends on whether certain match constraints are satisfied. In at least one exemplary embodiment, for each match, the pattern search controller module 280 determines metrics of the match based on, for example, the number of fields which participated in the match and the number of words consumed from the search query. The determined metrics are evaluated against requirements specified in the search configuration information stored in a configuration file to determine whether the match is a legitimate match. These requirements may include the minimum number of fields that must be matched, the maximum number of query terms that may be omitted, etc.

The configuration information related to match constraints should be considered during the building process to improve efficiency. In at least one exemplary embodiment, for example, matching criteria may specify a minimum and maximum number of fields from the field set that must be matched. The pattern search controller module 280 should build all query partitions as small as the minimum number of fields that must be matched and as large as the maximum number of fields that must be matched.

In some cases, it may be desirable for the pattern search controller module 280 to allow a query shingle to match on part of a field value but not the entire field value, i.e., an incomplete match on a field value. This may occur when there is no specific field attribute that appropriately describes some aspect of a given product. For example, for a product named "International Concepts Illusion-Stripe Sweater" there may not be a field attribute value for specifically describing "illusion-stripe". In such case, the pattern search controller module 280 may be configured to allow an incomplete match on a field that relates to a non-specific field attribute such as product name or product description.

If a field is configured for an incomplete match, an incomplete match strategy must be specified for the field. In at least one exemplary embodiment, an incomplete match strategy may involve index-time shingling for field attribute values such as product names. Index-time shingling may be applied to aspects of product description information that cannot be easily categorized as a particular attribute such as BRAND, COLOR, SIZE, PRODUCT_TYPE, etc. During the index building process, non-specific field attribute values may be partitioned using a shingling process similar to the one that is used in the query building process. Specifically, the pattern search controller module 280 generates a set of w-shingles for every value in a field and indexes them as additional values for the field. A w-shingle of a sequence of words is a contiguous subsequence of w words. For example, the set of w-shingles of length 3, i.e., a 3-shingles, for a sequence "a b c d e" would be "a b c", "b c d", and "c d e". W-shingling effectively converts any single-valued field into a multi-valued field.

For example, for a single-valued field product name "International Concepts Illusion-Stripe Sweater", the following w-shingle values "international", "international concepts", international concepts illusion", "international concepts illusion stripe", "concepts", "concepts illusion", "concepts illusion stripe", "concepts illusion stripe sweater", "illusion", "illusion stripe", "illusion stripe sweater", "stripe", "stripe sweater", and "sweater" would be generated and indexed in addition to its original value as a multivalued field SEARCH NAME.

Typically, the generated set of w-shingles is composed of all w-shingles of each length w, where w ranges from a minimum length of 1 to a maximum length equal to the maximum number of words permitted in a search query. In at least one exemplary embodiment, the minimum and maximum length w of the generated shingles may be configurable. Referring to the example above, if the maximum w length of the shingles were limited to 3 then the following shingles would be generated and indexed: "international", "international concepts", international concepts illusion", "concepts", "concepts illusion", "concepts illusion stripe", "illusion", "illusion stripe", "illusion stripe sweater", "stripe", "stripe sweater", and "sweater".

Ideally, prior to indexing, the generated w-shingles are processed by the same analyzer of the analysis module 240 that will be applied to the search query. The pattern search controller module 280 may need to create a separate indexed field that is transparent to the system.

Once the w-shingles are indexed, the pattern search algorithm applies the complete match logic to the w-shingled field values. Although a search query sub-phrase shingle is matched in whole to the w-shingled field values, a complete match on one of these fields is recognized by the pattern search controller module 280 as a partial match. In at least one embodiment, an incomplete match is recognized by comparing the matched shingle to the entire original field value.

Each search may have its own search configuration associated with a particular search strategy. In at least one exemplary embodiment, the configuration information for a particular pattern search may be defined in a configuration file, such as, for example an XML file. The configuration file may be used to store the general search configuration and particular configuration for each field. For example, the administrator may send configuration parameters and match constraints to the configuration module 220 which stores the information in an XML file that may be read by the pattern search controller module 280.

The table below shows an exemplary list of the general and field specific search parameters that may be part of a configuration file.

|  | Description |
| --- | --- |
| General Search Parameters | |
| field set | set of designated fields |
| search_type | e.g., pattern search or text search |
| maxWords | maximum input query length |
| maxOmitWords | maximum number of unmatched words in the search query |
| minFieldsMatch | minimum number of fields from the field set which must be matched |
| maxFieldsMatch | maximum number of fields from the field set which must be matched |

-continued

| | Description |
|---|---|
| multiMatch | boolean parameter that controls whether a field may be matched several times to different parts of the query |
| Field Specific Parameters | |
| match_type | e.g., COMPLETE: requires that there is a complete match between a phrase from the query partition and a field value; INCOMPLETE: requires that the field value contains the phrase from the query partition, but allows the field value to have unmatched terms; |
| match_strategy | e.g., defines a specific INCOMPLETE match_type algorithm for a particular field |
| must_match | e.g., boolean parameter that controls whether a particular field must be matched |
| stemming_mode | e.g., NONE; disables stemming; DEFAULT: applies the system wide stemming algorithm to the particular field |
| spellingAccuracy | e.g., integer percentage value indicating sensitivity of spell correction for the particular field |

The various configuration parameters may be used to set up different search strategies. For example, for exact matches and best partial matches, fields must be designated for complete matches because a complete match designation does not allow a field to have unmatched terms other than stop-words. For example, for exact matches and all term matches, maxOmitWords is set to zero, so that the pattern search controller module 280 must attempt to match all words of the search query (excluding stop-words). If it is unable to match all words of the search query, no results are returned. For example, for best partial matches and partial matches, maxOmitWords is set to a value greater than zero and less than maxWords, which allows the pattern search controller module 280 to leave up to maxOmitWords unmatched.

A search may be configured to allow the same multi-valued field to be matched several times to different, non-overlapping sub-phrases of a search query. Thus, for each field set, the matching criteria may also specify whether multiple matches on a field is allowed. For multi-valued fields, matching the field several times may be allowed provided that the matches happen on different values of that field. Every matched search query term is matched exactly once in a designated field. Matching the same term in more than one designated field is not allowed. However, all matches for the same field would only count as a single match for purposes of satisfying any match criteria.

Additionally, plug-in and/or extension modules for a search may also be received through the configuration interface module 220 and stored in the configuration module 240. For example, an administrator may provide different normalization algorithms to be used in addition or instead of the default normalization algorithms (e.g. stemming, spelling correction, abbreviations) in the analysis module 240. Normalization algorithms include filters that may be applied to search query terms to generate a standard set of query terms for purposes of indexing/searching by the search engine.

Preferably, the pattern search engine platform employs a modular design to take advantage of available third party software. In at least one exemplary embodiment, as shown in FIG. 1, the pattern search controller is implemented as a module that interacts with a typical search platform, for example, such as Solr/Lucene, Endeca, etc., which are standalone full text search servers. A general full text search server performs a search with configurable parameters, such as linguistic analyzers, matching strategies, ranking strategies, etc.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising the steps of:

providing a set of pre-defined searchable field names;

providing a database comprising a plurality of documents, wherein each document comprises a plurality of fields, each of the plurality of fields comprising one field name from the set of pre-defined searchable field names, and one or more field values, each field value comprising one or more field value terms;

receiving, using one or more processors, a search query containing a search string comprising one or more search string terms from a user device;

retrieving, using the one or more processors, from one or more data storage devices, search configuration information for the search query, wherein the search configuration information comprises a designated field set comprising one or more of the pre-defined searchable field names and a match constraint set of one or more configured match constraints;

generating, using the one or more processors, a plurality of query partitions based on the search string, wherein each of the plurality of query partitions comprises a sub-phrase set of one or more distinct sub-phrases, wherein the sub-phrase set of one or more distinct sub-phrases is created by segmentation of the search string into one or more non-overlapping sub-phrases;

generating, using the one or more processors, an internal query clause for each of the plurality of query partitions based on the retrieved search configuration information, the step of generating an internal query clause comprising:

(i) generating a plurality of designated field permutation subsets from the designated field set, each designated field permutation subset comprising an ordered subset of the one or more field names from the designated field set;

(ii) for each of the designated field permutation subsets, generating a multifield query clause comprising the ordered subset of the one or more field names from the designated field permutation subset with each of the one or more distinct sub-phrases of the query partition corresponding to a field value term of a respective one of the one or more field names from the designated field permutation subset;

executing, using the one or more processors, a query on the database based on an internal query comprising all of the generated internal query clauses to generate an internal query result, wherein the internal query result comprises (i) one or more internal match results obtained by searching all documents wherein at least one of the field value terms corresponds to one of the distinct sub-phrases of one of the internal query clauses;

(ii) determining, using the one or more processors, a set of match results by applying the match constraint set to the one or more internal match results; and (iii) when there are one or more match results, detecting one or more search patterns, wherein each search pattern comprises the field names and the field values corresponding to at least one of the field value terms corresponding to at least one of the distinct sub-phrases of one of the internal query clauses in at least one of the match results.

2. The method of claim 1, wherein at least one match result is obtained, further comprising the step of:

utilizing, using one or more processors, at least one of the search patterns as a search parameter for another search.

3. The method of claim 1, wherein the plurality of query partitions form a query partition coverage.

4. The method of claim 1, wherein a maximum number of terms in each of the distinct sub-phrases is less than or equal to the number of search string terms.

5. The method of claim 1, wherein at least one match result is obtained, further comprising the step of:

ranking, using one or more processors, the match results based on the one or more search patterns.

6. The method of claim 1, wherein the field value comprises a plurality of the field value terms and the match constraint set contains a match constraint which requires each document wherein the field value terms correspond to one of the distinct sub-phrases of one of the internal query clauses to have all of the field value terms corresponding to the one of the distinct sub-phrases.

7. The method of claim 1, wherein the match constraint set of one or more configured match constraints contains a match constraint which requires each document in the match results to have a plurality of field values wherein the field value terms correspond to each of the distinct sub-phrases of the query partition.

8. The method of claim 1, wherein the match constraint set of one or more configured match constraints contains a match constraint which requires a minimum number of search string terms corresponding between the field value terms of at least one of the field values and one of the distinct sub-phrases of one of the internal query clauses.

9. The method of claim 1, wherein the match constraint set of one or more configured match constraints contains a match constraint which requires a minimum number of the document fields wherein there exists correspondence between the field value terms of at least one of the field values and one of the distinct sub-phrases of one of the internal query clauses.

10. The method of claim 1, wherein each of the searchable fields is configured with its own match strategy.

11. The method of claim 1, wherein the match constraint set of one or more configured match constraints contains a match constraint which requires that the field names of the document fields, wherein there exists correspondence between the field value terms of at least one of the field values and one of the distinct sub-phrases of one of the internal query clauses, are all different field names.

* * * * *